US012723997B2

(12) United States Patent
Potyrailo

(10) Patent No.: US 12,723,997 B2
(45) Date of Patent: Sep. 1, 2026

(54) SYSTEMS AND METHODS FOR SENSING OF GASES USING A CONFIGURABLE DYNAMIC RANGE OF A SENSOR

(71) Applicant: GENERAL ELECTRIC COMPANY, Schenectady, NY (US)

(72) Inventor: Radislav Alexandrovich Potyrailo, Niskayuna, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 529 days.

(21) Appl. No.: 18/116,162

(22) Filed: Mar. 1, 2023

(65) Prior Publication Data

US 2024/0295518 A1 Sep. 5, 2024

(51) Int. Cl.
*G01N 27/22* (2006.01)
*G01N 1/44* (2006.01)

(52) U.S. Cl.
CPC ............. *G01N 27/221* (2013.01); *G01N 1/44* (2013.01); *G01N 27/227* (2013.01); *G01N 2027/222* (2013.01)

(58) Field of Classification Search
CPC ...... G01N 27/221; G01N 1/44; G01N 27/227; G01N 33/0004; G01N 27/026
See application file for complete search history.

(56) References Cited

U.S. PATENT DOCUMENTS 3,625,756 A 12/1971 Taguchi
3,631,436 A 12/1971 Taguchi
7,616,316 B1 11/2009 Silver et al.
7,710,568 B1 5/2010 Paige et al.
8,702,933 B2 4/2014 Ishige et al.
9,625,406 B2 4/2017 Zanella, Sr.
9,846,117 B2 12/2017 Zhou et al.
10,746,655 B2 8/2020 Liu et al.
2004/0129056 A1 7/2004 Hok et al.
2010/0252451 A1 10/2010 Warburton
2017/0138922 A1* 5/2017 Potyrailo ........... G01N 33/2888
2017/0187541 A1* 6/2017 Sundaresan ............ G01N 27/00
2021/0109049 A1* 4/2021 Potyrailo ............. G01N 27/026
2021/0164837 A1 6/2021 Bounaix et al.
2021/0278384 A1 9/2021 Potyrailo et al.
2022/0178865 A1 6/2022 Wang et al.

FOREIGN PATENT DOCUMENTS

EP 2279378 A2 2/2011

OTHER PUBLICATIONS

Clifford et al., Sensors and Actuators, "Characteristics of semiconductor gas sensors I. Steady state gas response", vol. 3, 1982-1983, pp. 233-254.

(Continued)

*Primary Examiner* — David Z Huang
(74) *Attorney, Agent, or Firm* — Fletcher Yoder, P.C.

(57) ABSTRACT

The techniques described herein provide sensing systems and methods that provide configurable sensitivity and extended dynamic range of gas measurements. The systems and methods apply dielectric excitation at two or more excitation frequencies to a sensing material via sensing electrodes. A linearity of the electrical signal is changed by changing the operation parameters of the gas sensing element of the sensor.

23 Claims, 6 Drawing Sheets

(56) References Cited

OTHER PUBLICATIONS

Yamazoe, Sensors and Actuators B: Chemical, "Toward innovations of gas sensor technology", vol. 108, Issues 1-2, Jul. 22, 2005, pp. 2-14.
Manakasettharn et al., ACS Publications, "Highly Sensitive and Exceptionally Wide Dynamic Range Detection of Ammonia Gas by Indium Hexacyanoferrate Nanoparticles Using FTIR Spectroscopy", Mar. 20, 2018, pp. 4856-4862.
Su et al., RSC Advances, "Pd-loaded SnO2 hierarchical nanospheres for a high dynamic range H2S micro sensor", Feb. 18, 2019, pp. 5987-5994.
Potyrailo et al., Nature Electronics, "Extraordinary performance of semiconducting metal oxide gas sensors using dielectric excitation", May 11, 2020, pp. 280-289.
Lou et al., Photonics Research, "Ultra-wide-dynamic-range gas sensing by optical pathlength multiplexed absorption spectroscopy", 2021, pp. 193-201.
Sensidyne, "SensAlert Plus Point Gas Detector", 2022.
Shao et al., Nanoscale, "Low temperature crystallization of transparent, highly ordered nanoporous SnO thin films: application to room-temperature hydrogen sensing", Issue 10, Aug. 30, 2011.
Potyrailo Radislav A. et al., "Boosting Stability of Electronic Multi-Gas Sensors", 2022 IEEE Sensors, IEEE, Oct. 30, 2022, pp. 1-4, XP034242992, DOI:10.1109/SENSORS2175.2022.9967318.

* cited by examiner

SYSTEMS AND METHODS FOR SENSING OF GASES USING A CONFIGURABLE DYNAMIC RANGE OF A SENSOR

STATEMENT REGARDING FEDERALLY SPONSORED RESEARCH & DEVELOPMENT

This invention was made with Government support under contract Agreement number W15QKN-18-9-1004 awarded by the ACC-NJ to the CWMD Consortium. The Government has certain rights in the invention.

BACKGROUND

Combustible gases are used in diverse applications ranging from cooking and heating to being used as fuel in engines. Combustible gases can include hydrogen and simple or small hydrocarbon molecules to long chain hydrocarbon molecules. In various contexts it may be useful to be able to detect the presence of such combustible gases, both within and outside of the combustion reaction area, from trace levels (part-per-billion (ppb) levels) to higher levels in order to ensure correct operation of assets. By way of example, monitoring of such combustible gases may be useful to ensure levels of such gases do not exceed lower explosive limits (LEL) in ambient air. In addition, by way of example, monitoring of such combustible gases may be also useful above LEL in ambient air in combustion and other industrial uses of hydrogen.

Gas sensors may be based on various sensing materials that can include metal oxide semiconductor (MOS) materials, dielectric polymers, conducting polymers, nanotubes, metal organic frameworks, graphene, supramolecular compounds, two-dimensional (2D) transition metal carbides and nitrides (MXenes), and others. Often, such gas sensors may demonstrate saturation of their response at high concentrations leading to false readings.

Conventional sensors such as optical, metal oxide semiconductor (MOS), electrochemical, catalytic pellistors, and thermal conductivity sensors have very narrow ranges for detection of gases, typically 2 to 3 orders of magnitude. This narrow range of detection is due to the nature of the mechanisms of interaction between the sensing materials and the ambient environment. For example, MOS sensors that involve resistance measurements of a MOS material can have significant commercial success relative to other types of sensors because of their broad applications for gas alarms in residential and industrial facilities. The readout of MOS materials is conventionally performed by measuring resistance change of the MOS material as a function of gas concentration. Such a relationship follows a well-known power law with a saturation of sensor response at high gas concentrations.

BRIEF DESCRIPTION

Certain embodiments commensurate in scope with the disclosed subject matter are summarized below. These embodiments are not intended to limit the scope of the invention, but rather these embodiments are intended only to provide a brief summary of certain disclosed embodiments. Indeed, the present invention may encompass a variety of forms that may be similar to or different from the embodiments set forth below.

With the foregoing in mind, present embodiments are directed to a gas sensor system and a method for analysis of at least one gas response signals of a MOS sensing material upon its dielectric excitation, in which one or more variables in the monitored environment are determined and accounted for. Specifically, in one embodiment, the gas sensor system may include a gas sensing element, one or more controllers (collectively, "control circuitry"), and an excitation/detection system as described. The one or more controllers may provide one or more control signals to monitor at least one component in an analyte gas. The excitation/detection system may be operatively coupled to the gas sensing element and the controller(s). The excitation/detection system may perform one or more operations based on the one or more control signals. The operations may include providing a plurality of stimulus signals to the gas sensing element, wherein the excitation/detection system is configured to provide each stimulus signal of the plurality of stimulus signals to the gas sensing element, receiving sensor responses from the gas sensing element in response to providing the plurality of stimulus signals, and determining one or more gas concentration values based on analyzing the sensor response to the plurality of stimuli. In accordance with such embodiments, each sensor response is associated with a particular stimulus signal.

In another embodiment, a method is provided that includes performing operations by the control circuitry, which consists of the one or more controllers of a gas sensor system. In accordance with this method, one or more control signals are provided, by one or more controllers of a gas sensor system, to cause generation of a plurality of stimulus signals to a gas sensing element of the gas sensor system. Sensor responses from the gas sensing element are received, by the controller, in response to providing the plurality of respective stimulus signals. Concentration values of one or more gases are determined based on analyzing the sensor responses to the plurality of respective stimulus signals.

In another embodiment, a computer-readable medium is described comprising computer-executable instructions that, when executed, cause a processor associated with a gas sensor system to perform operations. The operations may include providing one or more control signals to an excitation circuit of a gas sensor system to generate a plurality of stimulus signals to a gas sensing element of the gas sensor system, receiving sensor responses from the gas sensing element in response to providing the plurality of stimulus signals, and determining concentration values of one or more gases based on analyzing the sensor response.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
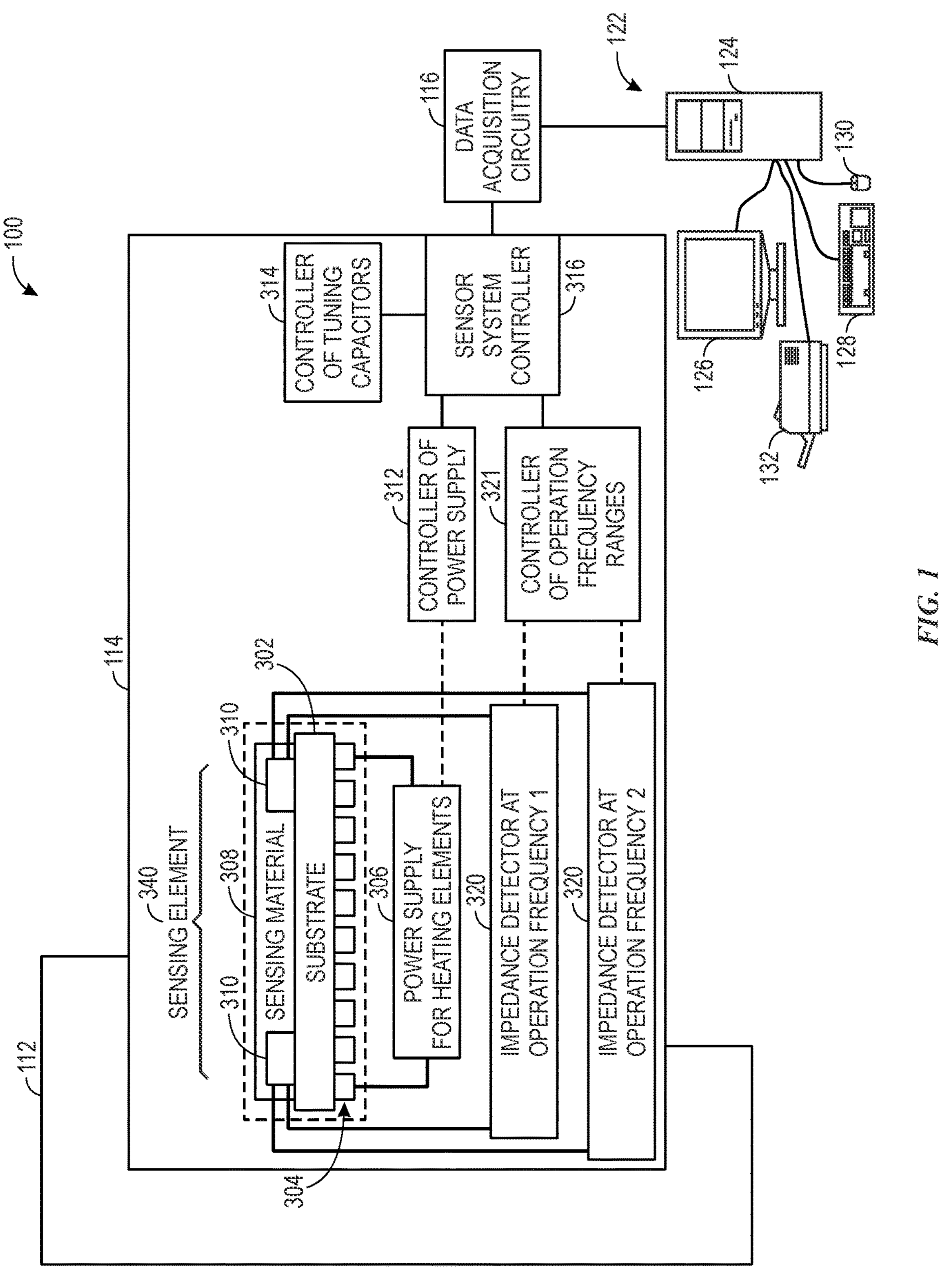
FIG. 1 illustrates one embodiment of a gas sensor system and a non-limiting example of a design of a sensor in accordance with one embodiment.

This written description uses examples as part of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

One or more embodiments of the subject matter described herein provide sensing systems and methods that provide configurable sensitivity and extended dynamic range of gas measurements. The systems and methods apply dielectric excitation at two or more excitation frequencies to a sensing material via sensing electrodes.

In some embodiments, excitation or dielectric excitation of the sensor (e.g., sensor that is utilizing a metal oxide semiconductor (MOS) sensing material) refers to an alternating current (AC) excitation of the sensor (e.g., the MOS sensing material) at a shoulder of its dielectric relaxation region. The dielectric excitation or AC excitation of the sensor can be performed when the sensing material is a MOS material, dielectric polymer material, conducting polymer material, nanotubes material nanowires material, nanoparticles material, metal organic frameworks material, graphene material, supramolecular compound material, MXene material and other materials.

Linearity of sensor response over the different ranges of gas concentrations is achieved by selection of one or more of the operation frequency, operation voltage of a heating element (i.e. generically called an energy-delivering element), and value of a tuning capacitor when measuring impedance of the gas sensing element of the sensor. As discussed herein, each sensor response is associated with a particular stimulus signal. Implementations of a gas sensor as described herein may have a dynamic range encompassing the limit of detection (LOD) of 5 ppb to 50% by volume, which is eight decades of hydrogen gas concentrations.

At least one technical effect of the various embodiments described herein is the capability to configure and reconfigure a sensitivity and dynamic range of a gas sensor used to acquire measurements of one or more gases. As discussed herein, such gas sensors may be based on diverse types of sensing materials. Dielectric excitation may be applied to a sensing material at multiple excitation frequencies. Based on the concentration of analyte gas to be detected, the system changes (e.g., dynamically changes) an impedance of the gas sensing element of the sensor based on the frequency of the dielectric excitation and the temperature and voltage of the heating element, or energy-delivering element. Changing the frequency of the dielectric excitation of the gas sensing element changes a linearity of the impedance responses of the sensor and controls the sensitivity of the sensor to different concentrations of the analyte of interest. Impedance of the gas sensing element at the at least one measurement frequency can be changed by adding a tuning capacitor to the gas sensing element circuit. Changing the frequency of the dielectric excitation and the temperature and voltage of the heating element expands the range of measured gas concentrations to eight orders of magnitude from 5 ppb to 50% by volume. Another technical effect of such extended dynamic range of measurements (e.g., a broad range of gas concentrations over which the sensor provides accurate readings) is the ability to measure a broad range of concentrations with a single sensor or single gas sensing element, as opposed to having or using different sensors for different concentration ranges. In general, the approach of using dielectric excitation expands the dynamic range of gas detection, improves sensor baseline stability, and significantly reduces, or even eliminates, humidity and ambient temperature effects. Unlike broad-band impedance spectroscopy, using a dielectric excitation approach uses specific frequency ranges by following the front (high- or low-frequency) shoulder of the spectral peak obtained from dielectric relaxation measurements of (n- or p-type, respectively) semiconducting metal oxide materials when they are exposed to various gas concentrations. Other sensing materials can be also utilized with their measurements based on dielectric excitation or AC excitation.

As previously stated, the approach of using dielectric excitation expands the dynamic range of gas detection. In particular, the present invention demonstrates that the selection of an appropriate operation frequency, a value of tuning capacitor, and an operation voltage of the heating element when measuring impedance of the gas sensing element of the sensor achieves an extended dynamic range of detection of a combustible gas to eight orders of magnitude.

In accordance with embodiments of this invention, a sensing element can operate at two or more different temperatures in combination with two or more values of tuning capacitors to achieve a desired broad dynamic range of measurements of gas concentrations. Variation of temperatures represent one of several types of energy-such as thermal energy—that can be varied to achieve a desired broad dynamic range of measurements of gas concentrations. Variations in temperatures can be in the range from −50° C. to +1000° C., including in the range from +20° C. to +800° C., and the range from +25° C. to +700° C.

Besides variation of temperatures, other types of energy that can be applied can involve radiant and mechanical (or acoustic) types of energy.

In an embodiment, radiant energy can be varied to achieve a desired broad dynamic range of measurements of gas concentrations. Radiant energy can employ variations in wavelength, and/or variations in intensity of radiant energy. Variations in wavelength of radiant energy can be in the range of the ultraviolet light to the visible light and to the infrared light. Variations in intensity of radiant energy can be in the range from 0.00001 milliWatts per $cm^2$ to 10000 milliWatts per $cm^2$, including in the range from 0.0001 milliWatts per $cm^2$ to 1000 milliWatts per $cm^2$, and the range from 0.001 milliWatts per $cm^2$ to 900 milliWatts per $cm^2$.

In an embodiment, mechanical (or acoustic) energy can be varied to achieve a desired broad dynamic range of measurements of gas concentrations. Mechanical (or acoustic) energy can employ variations in frequency of mechanical (or acoustic) energy. Variations in frequency of mechanical (or acoustic) energy can be in the range from 1 kHz to 10 GHz, including in the range from 10 kHz to 5 GHz, and the range from 20 kHz to 4 GHz.

Different individual types of energy can be applied in combination with two or more values of tuning capacitors to achieve a desired broad dynamic range of measurements of gas concentrations.

Different types of energy can be combined to be applied in combination with two or more values of tuning capacitors to achieve a desired broad dynamic range of measurements of gas concentrations. In an embodiment, thermal energy can be applied in combination with radiant energy. In another embodiment, thermal energy can be applied in combination with mechanical (or acoustic) energy. In another embodiment, mechanical (or acoustic) energy can be applied in combination with radiant energy. In another embodiment, thermal energy can be applied in combination with radiant energy and mechanical (or acoustic) energy.

In one or more embodiments of the disclosed subject matter described herein, the sensing material is a MOS sensing material. Conventional resistance measurements of MOS sensing materials can suffer from non-linear responses as a function of gas concentration because resistance responses follow a power law with a saturation of sensor response at high or increased concentration values. For example, such power law response is known to be observed when using MOS sensing materials. As a result, high gas concentrations saturate sensor responses, leading to underestimation of gas concentrations. The gas sensor systems and methods described herein provide improved sensitivity of the sensor to high or increased concentration values of the analyte of interest. These sensing systems and methods, in comparison to conventional sensing approaches, provide a low-cost sensing method and system with increased sensitivity and an extended dynamic range of gas concentrations, such as a dynamic range of eight orders of magnitude of gas concentrations from 5 ppb to 50% by volume. Relevant features of multivariable sensing as described herein include linearity of the observed responses, the ability to detect relatively low gas concentrations, and the ability to detect relatively high gas concentrations.

With the preceding in mind, FIG. 1 illustrates one embodiment of a gas sensor system 100. The gas sensor system 100 examines a fluid in contact with gas sensor 114. The fluid may be a gas, a liquid, a gas-liquid mixture, particles or particulate matter, or the like, containing one or more analyte gases therein. By way of example, in one implementation the fluid may be indoor or outdoor ambient air. Another example of the fluid is air at an industrial site, residential site, military site, battlefield site, construction site, urban site, or any other known site. Still, another example of the fluid may be transformer oil or any insulating fluid of an electrical equipment that is installed and/or disposed of below a ground level, above the ground level, near to the ground level, or any other position. In another embodiment, the fluid may be a gas or fuel, such as a hydrocarbon-based fuel or a hydrogen fuel. One example of the fluid is natural gas that is supplied to a powered system (e.g., a vehicle, or a stationary generator set) for consumption. Another example of the fluid is hydrogen gas that is supplied to a powered system (e.g., a road vehicle, an aircraft engine, or a stationary generator set) for consumption. Other examples of such a fluid can include, but are not limited to, gasoline, diesel fuel, jet fuel or kerosene, biofuels, petrodiesel-biodiesel fuel blends, natural gas (liquid or compressed), and fuel oils. Another example of the fluid is indoor or outdoor ambient air. Another example of the fluid is air at an industrial, residential, military, construction, urban, and/or any other known site. Another example of the fluid is ambient air with relatively small concentrations of hydrocarbons and/or other pollutants. Another example of the fluid is at least one gas dissolved in an industrial liquid such as transformer oil, bioprocess media, fermentation media, wastewater, and so forth. Another example of the fluid is at least one gas dissolved in a consumer liquid such as milk, non-alcoholic beverages, alcoholic beverages, cosmetics, and so forth. Another example of the fluid is at least one gas dissolved in a body liquid such as blood, sweat, tears, saliva, urine, and so forth.

The gas sensor system 100 may include a fluid reservoir 112 for holding the fluid and one gas sensor 114 at least partially disposed in, on, or within the fluid reservoir 112, as shown in FIG. 1. Alternatively, the sensor 114 may be set in a flow path of the fluid outside of the fluid reservoir 112, such as coupled to in-line connectors in fluid communication with the fluid reservoir 112 that define a flow path. The gas sensor 114 may be a sensor with at least two or more outputs that are substantially independent of each other. The fluid reservoir 112 may be in a form of a vessel with controlled volume or in a form of an open area such as an indoor facility (e.g., a room, a hall, a house, a school, a hospital, a confined space, or the like), or in the form of an outdoor facility (e.g., a city, a battlefield, a stadium, a gas-production site, a seashore, a forest, or the like). In one embodiment, the sensor 114 may provide continuous, periodic, or intermittent monitoring of the fluid within the reservoir or flow path. In one or more embodiments, the sensor 114 may be an impedance gas sensor, an electromagnetic sensor, a photonic sensor, an electronic sensor, a hybrid sensor, or another type of sensor. Optionally, the gas sensor 114 may be a sensor array.

The sensor 114 may detect characteristics or properties of the fluid via a resonant or non-resonant impedance spectral response. One or more of the inductor-capacitor-resistor resonant circuits (LCR resonators) may measure the resonant impedance spectral response of the sensor. A non-resonant impedance spectral response is measured when the circuit does not contain an inductor. The resonant or non-resonant impedance spectrum of the sensor 114 in proximity to the fluid varies based on sample composition and/or components and/or temperature. The measured resonant or non-resonant impedance values Z' (which may be the real part of impedance, Zre) and Z" (which may be the imaginary part of impedance, Zim) reflect the response of the sensor 114 to the fluid.

Suitable sensors may include single use or multi-use sensors. A suitable multi-use sensor may be a re-usable sensor that may be used during the lifetime of a system in which it may be incorporated. In one embodiment, the sensor may be a single use sensor that may be used during all or part of a reaction or process.

Data from the sensor 114 may be acquired via data acquisition circuitry 116, which may be associated with the sensor 114 or which may be associated with a control system, such as a controller or workstation 122 including data processing circuitry, where additional processing and analysis may be performed. The controller or workstation 122 may include one or more wireless or wired components, and may also communicate with the other components of the system 100. Suitable communication models include wireless or wired. At least one suitable wireless model includes radio frequency devices, such as radio frequency identification (RFID) wireless communications. Other wireless communication modalities may be used based on application specific parameters. Non-limiting examples include Bluetooth, Wi-Fi, 3G, 4G, 5G, and others. For example, where there may be electromagnetic field (EMF) interference, certain modalities may work where others may not. In one embodiment, the data acquisition circuitry 116 optionally can be disposed within the sensor 114 or be integral with the sensor 114. In other embodiments, the data acquisition circuitry 116 may be provided within or as part of a workstation 122, as shown in FIG. 1. Further, the workstation 122 can be replaced or integrated with a control system of the whole process where the sensor 114 and its data acquisition circuitry 116 may be connected to the control system of a production or combustion process. A nonlimiting example of workstation 122 is a stationary or a mobile networked or non-networked device.

The data acquisition circuitry 116 may be in the form of a sensor reader, which may be configured to communicate wirelessly or wired with the fluid reservoir 112 and/or the workstation 122. For example, the sensor reader may be a battery-operated device and/or may be powered using energy available from the main control system or by using harvesting of energy from ambient sources (light, vibration, heat, or electromagnetic energy).

Additionally, the data acquisition circuitry 116 may receive data from one or more gas sensors 114 (e.g., multiple sensors positioned at different locations in or around the fluid reservoir). The data may be stored in short-term and/or long-term memory storage devices, such as archiving communication systems, which may be located within or remote from the system and/or reconstructed and displayed for an operator, such as at the operator workstation. The gas sensors 114 may be positioned on or in oil fluid reservoirs, associated piping components, connectors, flow-through components, and any other relevant process components. The data acquisition circuitry 116 may include one or more processors or dedicated circuits configured or programmed to analyze the data received from the gas sensor 114. For example, the one or more processors may be one or more computer processors, controllers (e.g., microcontrollers), or other logic-based devices that perform operations based on one or more sets of instructions (e.g., software). The instructions on which the one or more processors operate may be stored on a tangible and non-transitory computer readable storage medium, such as a memory device. The memory device may include a hard drive, a flash drive, RAM, ROM, EEPROM, and/or the like. Alternatively, one or more of the sets of instructions that direct operations of the one or more processors may be hard-wired into the logic of the one or more processors, such as by being hard-wired logic formed and/or stored in the hardware of the one or more processors. Alternatively, the data acquisition circuitry 116 may be implemented as one or more application specific integrated circuits (ASICs).

In addition to displaying the data, the operator workstation 122 may control the above-described operations and functions of the system 100. The operator workstation 122 may include one or more processor-based components, such as general purpose or application-specific computers 124 or similar processor-based systems. In addition to the processor-based components, the computer may include various memory and/or storage components including magnetic and optical mass storage devices, internal memory, such as RAM chips. The memory and/or storage components may be used for storing programs and routines for performing the techniques described herein that may be executed by the operator workstation 122 or by associated components of the system 100. Alternatively, the programs and routines may be stored on a computer accessible storage and/or memory remote from the operator workstation 122 but accessible by network and/or communication interfaces present on the computer 124. The computer 124 may also comprise various input/output (I/O) interfaces, as well as various network or communication interfaces. The various I/O interfaces may allow communication with user interface devices, such as a display 126, keyboard 128, electronic mouse 130, and printer 132, that may be used for viewing and inputting configuration information and/or for operating the imaging system. Other devices, not shown, may be useful for interfacing, such as touchpads, heads up displays, microphones, and the like. The various network and communication interfaces may allow connection to both local and wide area intranets and storage networks as well as the Internet. The various I/O and communication interfaces may utilize wires, lines, or suitable wireless interfaces, as appropriate or desired.

Figure 2:
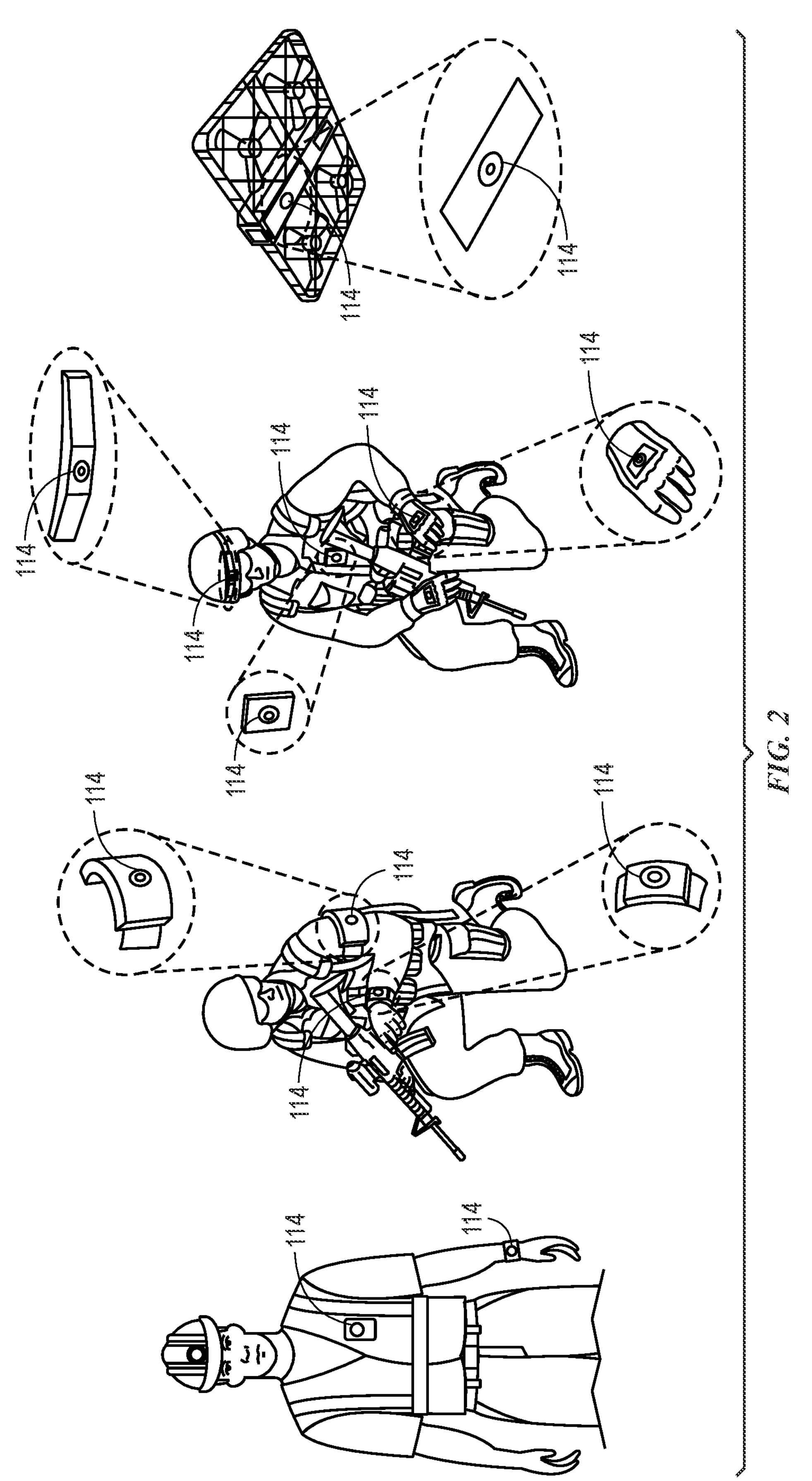
FIG. 2 illustrates exemplary positions of a gas sensor system as a wearable gas sensor system or as mounted on an unmanned vehicle in accordance with one embodiment.

In one or more embodiments, the sensor 114 may be a wearable device worn by a subject, such as a human or an animal, or mounted on an unmanned vehicle as illustrated by FIG. 2. Specifically, FIG. 2 illustrates non-limiting examples of positions of the gas sensing system for detection of a combustible gas or any other gas or vapor of interest using a single sensor 114 with a broad dynamic range. FIG. 2 demonstrates various positions a wearable sensor 114 may be worn. For example, the wearable sensor 114 may be worn directly on the body of a subject. Alternatively, the wearable sensor 114 may be removably coupled or integrated with an article worn by a subject. For example, as illustrated in FIG. 2, the wearable sensor 114 may be worn on military or industrial headgear, on a shirt sleeve, or on the front of a shirt or jacket or vest. Additionally, the wearable sensor 114 may be worn on the hand or wrist, either directly on the body or integrated on a glove, as depicted in FIG. 2. Alternatively, the wearable sensor 114 may be removably coupled or integrated with a non-wearable transferrable object, such as an unmanned vehicle, for example on an unmanned ground or aerial or other vehicle. In this way, the wearable sensor 114 may be coupled or integrated with any alternative object or device that may be transferrable such that the sensor 114 can be moved between different positions, may be stationary or substantially stationary, or the like. Although not shown in FIG. 2, the wearable sensor may also be removable coupled or integrated with eyeglasses, pants, a safety vest, safety personal protection clothing, a hat, a hearing device, or any other wearable device or article of clothing. In the illustrated embodiment of FIG. 2, the subject is a human subject, however the subject may be a mammal subject, a plant subject, a robot subject, or the like.

An electrical field may be applied to a sensing material 308 of the sensor 114 via electrodes 310. The distance between the electrodes, the electrodes' geometry, and/or the applied periodic voltage to the electrodes may define the magnitude of the electric field applied to the sensor 114 (e.g., to the sensing material or film). The electrodes 310 may be in direct contact with the sensing material 308, as shown in FIG. 1. For example, the sensor 114 may be a combination of a sensing region and associated circuits and/or the sensing region may be coated with the sensing material 308. The sensing material 308 may be semiconductor material or metal oxide material or MOS material. The sensing material 308 may be any sensing material.

Suitable interdigital electrode structures for probing a fluid sample include two- and four-electrode structures. Suitable materials for electrodes include, platinum, gold, noble metals, and others. Suitable materials of a dielectric substrate may include silicon dioxide, silicon nitride, alumina, ceramics, and others. Suitable examples of sensing materials or sensing films include a metal oxide material, a composite material, semiconducting materials, n-type semiconducting materials, p-type semiconducting materials, nanocomposite materials, inorganic materials, organic materials, polymeric materials, formulated materials, nanotubes materials, nanowires materials, nanoparticles materials, metal organic frameworks materials, graphene materials, supramolecular compound materials, MXene materials, any known sensing material, or the like. Suitable electrodes may be formed using metal etching, screen-printing, ink-jet-printing, and mask-based metal deposition techniques. The thickness of fabricated electrodes on the substrates may be in the range from about 10 nanometers to about 1000 micrometers. The materials for the interdigital electrode structures, substrate, sensing layer, and electrode formation methods may be selected based at least in part on the application specific parameters.

Returning to FIG. 1, this figure illustrates one embodiment of the gas sensor 114. The sensor 114 may represent another version of the sensors or sensing systems described herein. The sensor 114 includes a gas sensing element 340 having a dielectric substrate 302, such as a dielectric material, a sensing film or sensing material 308 that is coupled to the dielectric substrate 302, and electrodes 310. The sensing material 308 may be exposed to at least one analyte gas. In one or more embodiments of the subject matter described herein, the sensing material 308 utilizes a metal oxide semiconductor sensing film. The sensing material 308 can include one or more materials deposited onto the dielectric substrate 302 to perform a function of predictably and reproducibly affecting the impedance sensor response upon interaction with the environment. For example, a metal oxide, such as $SnO_2$, may be deposited as the sensing material 308. The sensing material 308 is exposed to, in contact with, in indirect contact with, or the like, the fluid containing at least one analyte gas. One or several heating elements 304, such as high resistance bodies, are coupled to a different side of the dielectric substrate 302 relative to the sensing material 308. The heating element 304 (i.e. generically called an energy-delivering element) receives electric current from a power supply for the heating element 306 (i.e. generically called an energy source of the energy-delivering element), which represents hardware circuitry that conducts the heater current or voltage to the heating element 304 to heat, or deliver energy to, the dielectric substrate 302 and to heat, or deliver energy to, the sensing film or sensing material 308 that is coupled to another side of the dielectric substrate 302. The energy source may produce any combination of thermal, radiant, or acoustic types of energy. The heating element 304 may be controlled by the control circuitry or, more specifically, a controller of the power supply 312, which selects an appropriate power for the electric current received by the heating element 304 to achieve an operation temperature (i.e. generically called an operation energy level) and an operation voltage (i.e. generically called a selected energy level) based on preselected operation parameters. In the depicted example, the heating element 304 is on the opposite side of the dielectric substrate 302 relative to the sensing material 308. Alternatively, the sensing material 308 and the heating element 304 may be coupled on the same side of the dielectric substrate 302.

Figure 3:
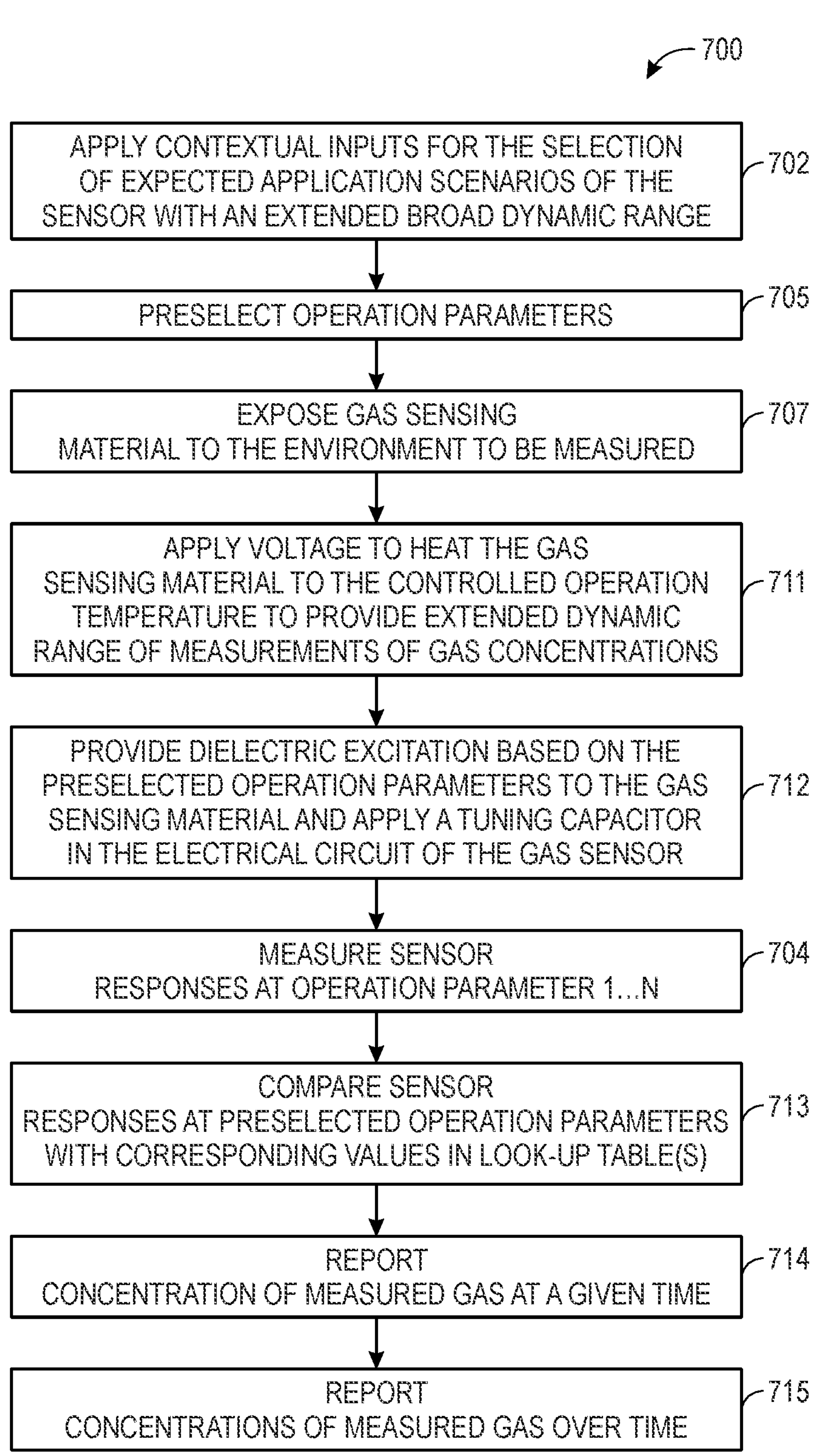
FIG. 3 illustrates a flowchart of one embodiment of a method for sensing an analyte gas of interest in accordance with one embodiment.

The sensing electrodes 310 are coupled with and/or disposed in the sensing material 308 and are connected with the dielectric substrate 302 in the illustrated embodiments shown in FIGS. 3 and 4. The sensing electrodes 310 are conductive bodies that are conductively coupled with an impedance detector 320. The impedance detector 320 operates at two or more operation frequencies at the shoulder of the dielectric relaxation region of the impedance spectrum of the sensing material 308. In the illustrated embodiment, the sensing electrodes 310 are directly and independently conductively coupled with the impedance detector 320. Optionally, the sensing electrodes 310 may be directly or indirectly conductively coupled with the impedance detector 320. The impedance detector 320 may be communicatively coupled to the control circuitry including a controller of operation frequency ranges 321 to provide two or more measurement frequencies, where the first measurement frequency is lower than the second measurement frequency. The controller of operation frequency ranges 321 may have one or more processors or circuits that may include one or more microprocessors, field programmable gate arrays, and/or integrated circuits.

In one or more embodiments, the sensing electrodes 310 may be coated with a sensing material that is responsive to one or more analyte gases of interest. The controller of operation frequency ranges 321 may direct the impedance detector 320 to select a first frequency for the dielectric excitation of sensing material and to perform measurements at the first frequency of the impedance response of sensing material. Next, the controller of operation frequency ranges 321 may then direct the impedance detector 320 to select the second frequency for the dielectric excitation of sensing material and to perform measurements at the second frequency of the impedance response of the sensing material. The phrase "dielectric excitation of sensing material" may be used synonymously the phrase "AC excitation of sensing material at its shoulder of the dielectric relaxation spectrum".

In one or more embodiments, the operation frequency range of the dielectric excitation measurements may be tuned by one or more tuning capacitors 314 in electric circuit of the sensor 114 that is parallel with the gas sensing element 340 and the impedance detector 320. For example, the impedance detector 320 may receive an electrical signal from the sensing electrodes 310 that represents the response signals measurement or response of the gas sensing element 340 upon its dielectric excitation during exposure of the sensing material 308 to the fluid sample at the operating temperature. In alternative embodiments, the impedance detector 320 may be referred to as a detector system that is utilizing an AC excitation source. The impedance detector 320 examines the electrical impedance of the gas sensing element 340 in order to determine the presence and/or amount (e.g., concentration) of one or more analyte gases in the environment to which the sensing material 308 is exposed, as described herein. In this way, the controller of operation frequency ranges 321 may provide scanning capability to measure sensor impedance responses at multiple discrete frequencies. Additionally, the controller of operation frequency ranges 321 may provide capability to measure sensor impedance responses across a frequency range.

Also included in the control circuitry may be a gas sensor system controller 316, which may be operatively coupled with the controller of operation frequency ranges 321 and the controller of the power supply 312. The gas sensor system controller 316 includes one or more processors that include one or more microprocessors, field programmable gate arrays, and/or integrated circuits. The gas sensor system controller 316 selects and controls one or more tuning capacitors 314 to provide extended range of measurements of gas concentrations.

FIG. 3 illustrates a flowchart of one embodiment of a method 700 for sensing one or more analyte gases of interest in accordance with one embodiment. The method 700 can represent the operations performed by the gas sensor system 100 and the gas sensing element 340 described herein, or optionally can represent the operations performed by another sensing system and/or another gas sensor. For example, the method 700 can represent operations performed by the system 100 and/or the gas sensing element 340 under direction of one or more software applications, or optionally can represent an algorithm useful for writing such software applications.

At 702, contextual inputs are applied for selection of expected application scenarios of the gas sensor 114 with extended dynamic range. Non-limiting examples of contextual inputs can include intended sensor uses as a certain wearable device or as a permanent installation. Contextual inputs may also include the expected gas concentration in a certain environment or the concentration of an analyte gas an operator may need to detect to ensure the environment is safe to occupy. Other contextual inputs may include a geographical area of the sensor use, a location based on Global Positioning System coordinates, particular rural or urban locations, an elevation at a particular location, and so forth. Other contextual inputs may include the type of sensing material being used or the type of an expected analyte gas to be measured. At 705, a first set of operation parameters is further selected based on the contextual inputs. The first set of operation parameters include a selected operation voltage of the heating element 304, two or more frequencies of dielectric excitation, and a selected capacitance of one or more capacitors. Depending on the analyte gas to be detected, the sensor type, the sensing material, the expected concentration level of the analyte gas, the number of operation parameters can range from 1 to N, where N can be from 2 to 4 in one implementation. The operation parameters may include a first operation voltage, a set of two or more frequencies of the impedance detector 320, where the impedance detector 320 measures the imaginary part of sensor impedance Z" at the high-frequency or the low-frequency shoulder of the dielectric relaxation spectrum with a tuning capacitor 314 with a selected capacitance.

Figure 5:
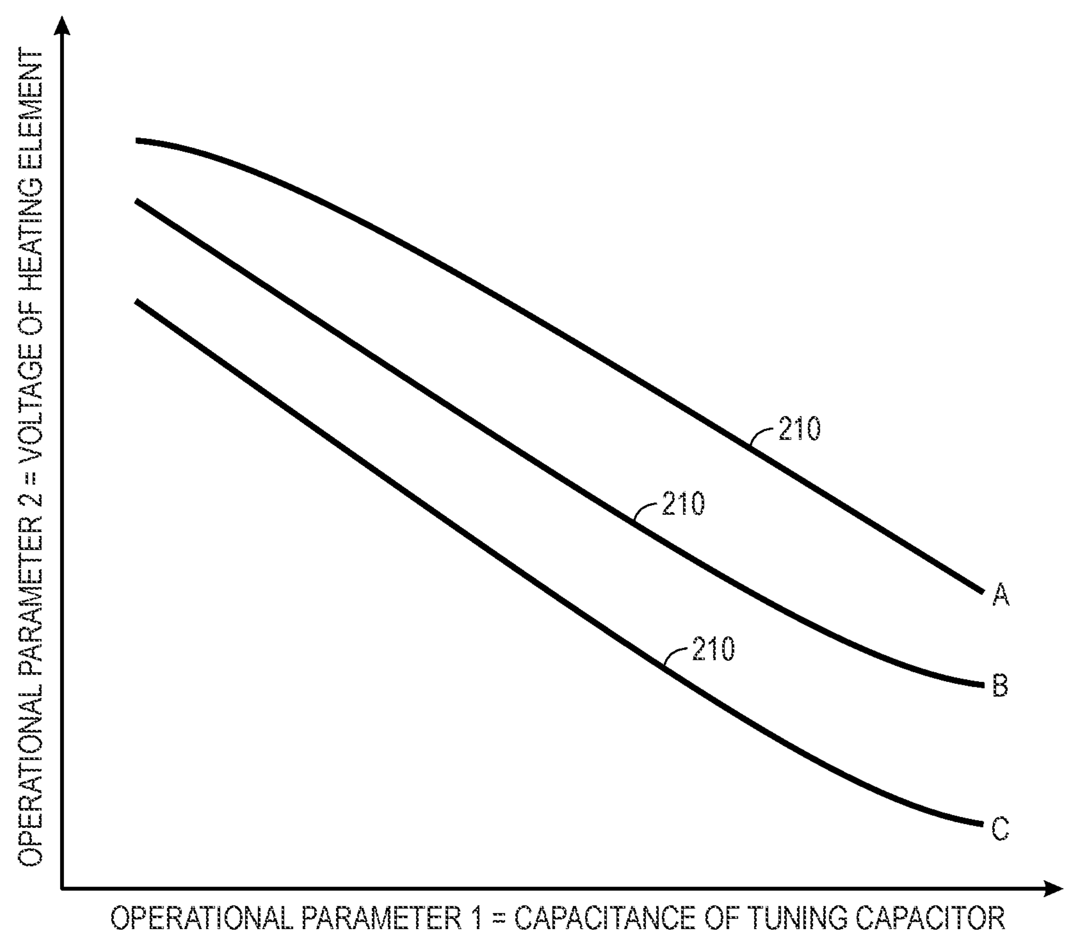
FIG. 5 illustrates a schematic plot of optimal values of operation parameter 1 and operational parameter 2 to obtain responses of a gas sensing element for the highest dynamic range for different analyte gases A, B, and C in accordance with one embodiment.

For example, to measure relatively low concentrations of gas, operation parameters may include a first sensor operation voltage to achieve a first operation temperature of the heating element 304 and a measurement, via the impedance detector 320, the imaginary part of sensor impedance Z" at the high-frequency or the low-frequency shoulder of the dielectric relaxation spectrum of the MOS material with one or more tuning capacitors 314 set at a first one or more capacitance based on a first set of two or more frequencies. To measure relatively high concentrations of gas, the operation parameters include a second sensor operation voltage to achieve a second operation temperature and a measurement, via the impedance detector 320, the imaginary part of sensor impedance Z" at the high-frequency or the low-frequency shoulder of the dielectric relaxation spectrum of the MOS material with the one or more tuning capacitors 314 set at a second one or more capacitance based on a second set of two or more frequencies. In general, the first operation voltage and temperature are higher than the second operation voltage and temperature. That is, the first operation voltage and temperature associated with detecting relatively low concentrations of gas may be larger than the second operation voltage and temperature associated with detecting relatively high concentrations of gas. In general, the first one or more capacitance is smaller than the second tuning capacitance. That is, the capacitance associated with detecting relatively low concentrations of gas may be lower than the capacitance associated with detecting relatively high concentrations of gas. As such, in embodiments with more than one tuning capacitor, the first tuning capacitor may be smaller than the second tuning capacitor. Similarly, in general, the first set of two or more frequencies may be lower than the second set of two or more frequencies. That is, the two or more frequencies associated with detecting relatively low concentrations of gas will be lower than the two or more frequencies associated with detecting relatively high concentrations of gas. In another embodiment, the first set of two or more frequencies may be the same or similar to the second set of two or more frequencies. Measurements of relatively low concentrations of gas and relatively high concentrations of gas may be performed with the same impedance detector 320 that operates at the two or more operation frequencies at the shoulder of the dielectric relaxation region of the impedance spectrum of the MOS sensing material. Manipulation of the above-described variables may be repeated for operation parameters 1 through N to expand the range of detected gas concentrations to eight orders of magnitude from 5 ppb to 50% by volume. FIG. 5 demonstrates how manipulation of multiple (two) variables may result in optimal positions of responses 210 for the highest dynamic range for different analyte gases and various gas sensing elements (e.g., A, B, and C). The first operation voltage and temperature can be lower than the second operation voltage and temperature.

At 707, 711, and 712, the gas sensor 114 is operated under the preselected operation parameters and is presented to the measured environment. Specifically, at 711, the heating element 304 heats the sensing material 308 based on the preselected excitation parameters (i.e., dielectric excitation frequency and temperature). At 712, the sensing electrodes 310 apply a first dielectric excitation to the sensing material 308 of the gas sensing element 340 based on the preselected operation voltage to detect and obtain one or more electrical signals representative of the sensor 114 response to the dielectric excitation. One or more tuning capacitors 314 are also applied at this step to an electrical circuit of the gas sensor 114. In one or more embodiments, the first dielectric excitation can be done or applied to the sensing material 308 at a first dielectric excitation frequency. In one embodiment, the electrodes 310 may apply dielectric excitation at a single excitation frequency of about 400 kHz, however the dielectric excitation may be applied at a different excitation frequency such as at 10 kHz, 100 kHz, 1 MHz, 10 MHZ, or 100 MHZ, or any other frequency. The sensing material 308 may be exposed to varying ranges of concentrations of hydrogen, methane, ethane, propane, butane, propene, butene, ethylene, acetylene, isobutylene, or any alternative analyte gas or gases.

Which tuning capacitor 314 is selected or how the one or more tuning capacitors 314 are adjusted may depend on the operation frequency parameters selected. For example, to detect lower concentrations of gas, the gas sensor 114 may use one or more tuning capacitors 314 of a first capacitance. And to detect higher concentrations, the gas sensor 114 may use one or more tuning capacitors 314 of a second capacitance. For example, at 704, the gas sensor 114 response is measured under the preselected frequency of dielectric excitation, which includes measurements of the imaginary part of sensor impedance Z" at the high-frequency shoulder of the dielectric relaxation spectrum with the tuning capacitor 314 selected based on a first preselected frequency. The gas sensor 114 response may be represented by an electrical signal, which may represent an electrical impedance or impedance response of the gas sensing element 340 during exposure of the sensing material 308 to the first dielectric excitation over a range of concentrations of one or more analytes of interest. The response data is acquired via the data acquisition circuitry 116. At 713, the gas sensor 114 response at the preselected operation parameters is compared with corresponding values in a look-up table via the acquisition circuitry 116. At 714 and 715, the data acquisition circuitry 116 then reports the detected concentration of measured gas at a given time and/or over time, which may be displayed via the operator workstation 122.

The method 700 disclosed herein and corresponding gas sensor 114 may be used for detecting at least eight decades of analyte gas concentrations, whereas conventional sensors have a typical range of two to three decades, rarely extending to four to six decades of gas concentrations. For example, to obtain a desired substantially linear response to relatively low analyte gas concentrations, monitoring of sensor response is selected to be performed using appropriate operation parameters.

To obtain a desired substantially linear response to relatively high gas concentrations, monitoring of sensor response is selected to be done under appropriate operation parameters of the same sensor summarized as "second operation parameters." Depending on the detected combustible, toxic, hazardous or pollutant gas, sensor type, and the selected operation parameters that constitute the operation parameters, the number of such operation parameters can range from 1 to N, where N can be from 2 to 4 in one implementation.

Measurements of relatively low gas concentrations and relatively high gas concentrations are performed with the same impedance detector 320 that operates at the two or more operation frequencies at the shoulder of the dielectric relaxation region of the impedance spectrum of the MOS sensing material. In measurements of relatively low gas concentrations, the first operation parameters include measurements of the imaginary part of sensor impedance Z" at the high-frequency shoulder of the dielectric relaxation spectrum of the MOS material with the first tuning capacitor at the first measurement frequency and the first operation voltage of the heating element 304. In measurements of relatively high gas concentrations, the second operation parameters include measurements of the imaginary part of sensor impedance Z" at the high-frequency shoulder of the dielectric relaxation spectrum of the MOS material with the second tuning capacitor at the second measurement frequency and the second operation voltage of the heating element 304.

Thus, the method involves a combination of the first value of the tuning capacitor 314 and the first value of the operation voltage of the heating element 304 to provide the first range of measurements of gas concentrations. The method further involves a combination of the second value of the tuning capacitor 314 and the second value of the operation voltage of the heating element 304 to provide the second range of measurements of gas concentrations (i.e., the extended dynamic range of measurements of gas concentrations). The method may further involve measurements of combustible, toxic, hazardous or pollutant gases. The method may further involve measurements at the high-frequency shoulder or the low-frequency shoulder of the of the dielectric relaxation spectrum of a sensing material. The method may further involve measurements with a metal oxide semiconductor material, dielectric polymer material, conducting polymer material, nanotubes material, nanowires material, nanoparticles material, metal organic frameworks material, graphene material, supramolecular compound material, MXene material and other materials. Another sensing material can be a two-dimensional carbon allotrope such as a semiconducting diamane. Yet another sensing material can be a graphullerene, which is an atom-thin material made of linked fullerene subunits.

For example, the excitation parameters for detection of a relatively low gas concentration (i.e., the first operation parameters including a first operation frequency, a first operation temperature, and a first tuning capacitor) differ (e.g., are larger or smaller) than the excitation parameters for detection of a relatively high gas concentration, or second operation parameters, (i.e., the $N^{th}$ operation voltage and $N^{th}$ temperature). The capacitance of the first tuning capacitor is smaller than the capacitance of the second tuning capacitor of the sensor. The first operation temperature is larger than the second operation temperature of the sensor. The first measurement frequency is lower than the second measurement frequency of the sensor.

In one embodiment, information from the readings of the gas sensor 114 that has the broad dynamic range of measurements of gas concentrations can be implemented for informational purposes via an alarm. That is, the gas sensor may be communicatively coupled to an alarm to provide alerts such as visual, acoustic, and/or haptic or any other known alerts. Alarms can be produced or issued on the gas sensor system 100 with the gas sensor 114. Alarms can be transmitted to a central station or can be transmitted to another gas sensor system 100 with the similar or different gas sensor 114. Alarms can be in the form of quantitative information such as the concentration of the detected gas. For example, an alarm coupled to the gas sensor 114 may provide an alert when the detected gas concentration exceeds a threshold. Alarms can be in the form of qualitative and/or semi-quantitative information such as binned levels of the detected gas, for example three bins such as yellow, orange, and red levels of alarms.

In another embodiment, information from the readings of the gas sensor 114 that has the broad dynamic range of measurements of gas concentrations can be implemented for decision-making purposes. Decision-making purposes can include actions such as activation of an emergency response, activation of a particular treatment or decontamination of the subject having the gas sensor system 100 with the gas sensor 114. Decision-making purposes can include actions such as optimization of logistics steps after the knowledge about the detected concentration of the gas. Decision-making purposes can include actions such as minimization of logistics steps after the knowledge about the detected concentration of the gas.

Figure 4A:
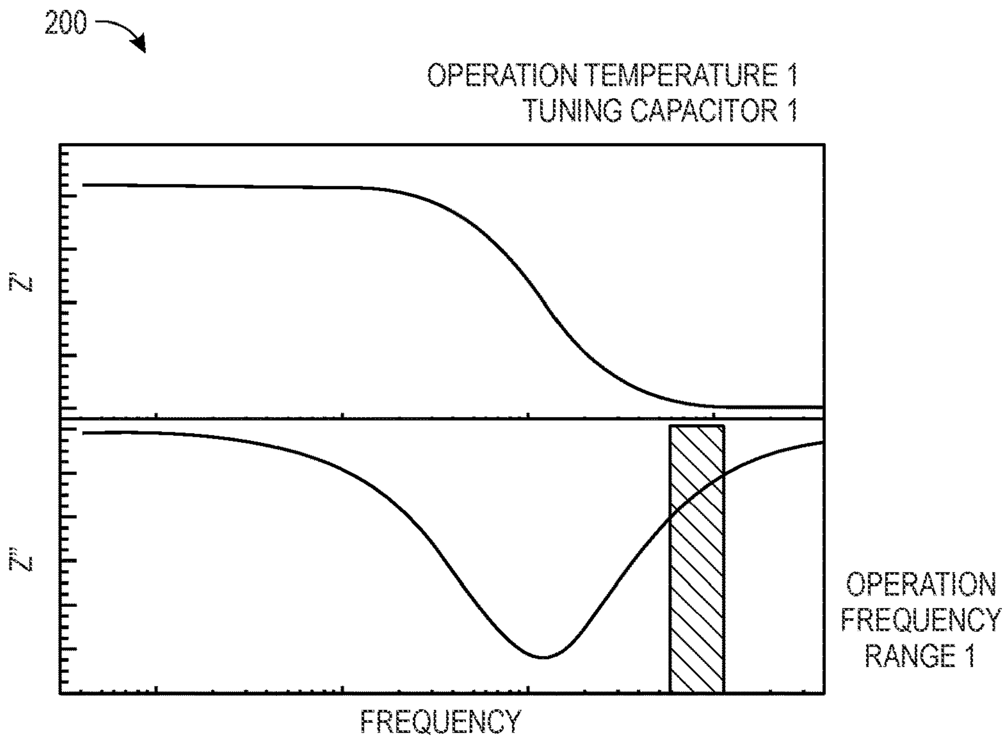
FIG. 4A illustrates a plot of the real and imaginary parts of impedance spectrum of a MOS sensing element and a schematic position of an operation frequency range 1 to obtain a substantially linear response to relatively low gas concentrations achieved by monitoring sensor response under a first operation voltage and a first operation temperature and measuring sensor response with a first tuning capacitor of a first capacitance at a first frequency in accordance with one embodiment.

FIG. 4A illustrates a plot 200 of the real and imaginary parts of impedance spectrum of a MOS sensing element identifying the first operation frequency at a first operation state. Specifically, a substantially linear response to relatively low gas concentrations is achieved by monitoring sensor response under its operation voltage and first temperature, and measuring sensor impedance Z" with the first tuning capacitor at the first measurement frequency.

Figure 4B:
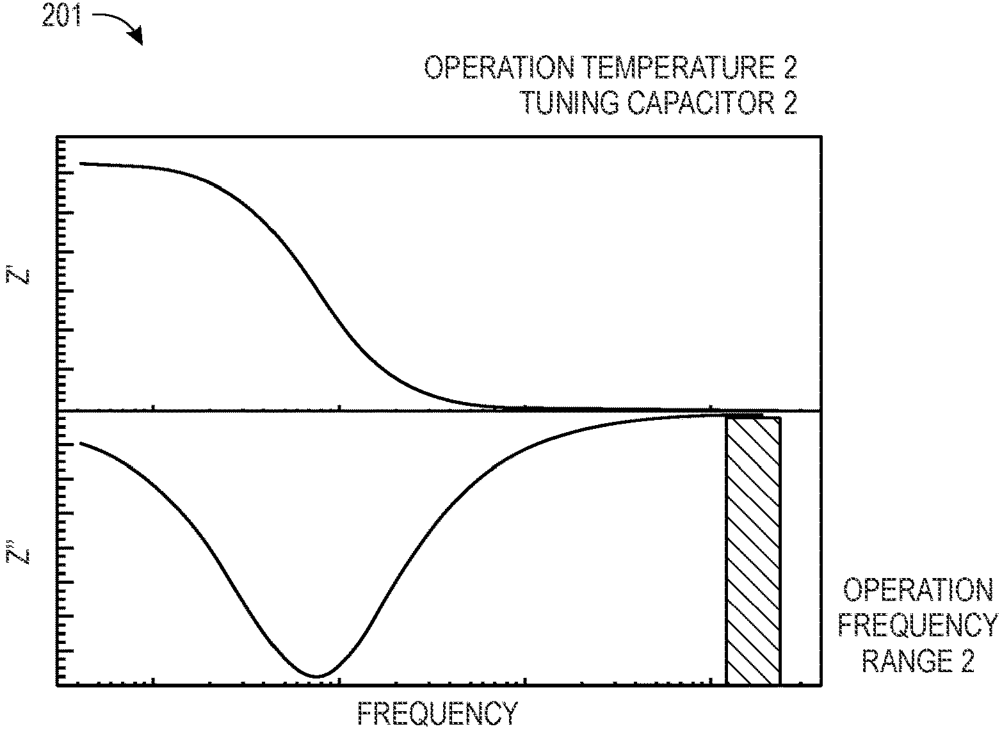
FIG. 4B illustrates a plot of the real and imaginary parts of impedance spectrum of a MOS sensing element and a schematic position of an operation frequency range 2 to obtain of a substantially linear response to relatively high gas concentrations achieved by monitoring sensor response under a second operation voltage and a second operation temperature and measuring sensor response with a second tuning capacitor of a second capacitance at a second frequency in accordance with one embodiment.

FIG. 4B illustrates a plot 201 of the real and imaginary parts of impedance spectrum of a MOS sensing element identifying the second operation frequency at the second operational state. Specifically, a substantially linear response to relatively high gas concentration is achieved by monitoring sensor response under its operation voltage and second temperature, and measuring sensor impedance Z" with the second tuning capacitor at the second measurement frequency.

The analyte gases may include a wide range of materials and/or chemicals of various hazard indexes. Materials having a "high" hazard index may include, for example, Ammonia, Arsine, Boron trichloride, Boron trifluoride, Carbon disulfide, Chlorine, Diborane, Ethylene oxide, Fluorine, Formaldehyde, Hydrogen bromide, Hydrogen chloride, Hydrogen cyanide, Hydrogen fluoride, Hydrogen sulfide, Nitric acid, fuming, Phosgene, Phosphorus trichloride, Sulfur dioxide, Sulfuric acid, and Tungsten hexafluoride.

Materials having a "medium" hazard index may include, for example, Acetone cyanohydrin, Acrolein, Acrylonitrile, Allyl alcohol, Allylamine, Allyl chlorocarbonate, Boron tribromide, Carbon monoxide, Carbonyl sulfide, Chloroacetone, Chloroacetonitrile, Chlorosulfonic acid, Diketene, 1,2-Dimethylhydrazine, Ethylene dibromide, Hydrogen selenide, Methanesulfonyl chloride, Methyl bromide, Methyl chloroformate, Methyl chlorosilane, Methyl hydrazine, Methyl isocyanate, Methyl mercaptan, Nitrogen dioxide, Phosphine, Phosphorus oxychloride, Phosphorus pentafluoride, Selenium hexafluoride, Silicon tetrafluoride, Stibine, Sulfur trioxide, Sulfuryl chloride, Sulfuryl fluoride, Tellurium hexafluoride, n-Octyl mercaptan, Titanium tetrachloride, Trichloroacetyl chloride, and Trifluoroacetyl chloride.

Materials having a "low "hazard index may include, for example, Allyl isothiocyanate, Arsenic trichloride, Bromine, Bromine chloride, Bromine pentafluoride, Bromine trifluoride, Carbonyl fluoride, Chlorine pentafluoride, Chlorine trifluoride, Chloroacetaldehyde, Chloroacetyl chloride, Crotonaldehyde, Cyanogen chloride, Dimethyl sulfate, Diphenylmethane-4,40-diisocyanate, Ethyl chloroformate, Ethyl chlorothioformate, Ethyl phosphonothioic dichloride, Ethyl phosphonic dichloride, Ethyleneimine, Hexachlorocyclopentadiene, Hydrogen iodide, Iron pentacarbonyl, Isobutyl chloroformate, Isopropyl chloroformate, Isopropyl isocyanate, n-Butyl chloroformate, n-Butyl isocyanate, Nitric oxide, n-Propyl chloroformate, Parathion, Perchloromethyl mercaptan, sec-Butyl chloroformate, tert-Butyl isocyanate, Tetraethyl lead, Tetraethyl pyrophosphate, Tetramethyl lead, Toluene 2,4-diisocyanate, and Toluene 2,6-diisocyanate. Analyte gases may also include a range of indoor environmental agents, such as Acetaldehyde, Formaldehyde, 1,3-Butadiene, Benzene, Chloroform, Methylene chloride, 1,4-Dichlorobenzene, Perchloroethylene, Trichloroethylene, Naphthalene, Polycyclic aromatic compounds, as well as outdoor environmental agents, such as Ozone, Nitrogen dioxide, Sulfur dioxide, Carbon monoxide. Further, the analyte gases may include industrial agents, such as combustibles, confined space hazards, and so forth.

Experiments were performed using the disclosed methods to demonstrate that the disclosed gas sensor 114 has a dynamic range ranging from the limit of detection of 5 ppb to 50% by volume, which is eight decades of gas concentrations. For these experiments, hydrogen gas was selected as an analyte gas as an example. A low-electrical power consumption gas sensing element was utilized. The gas sensing element had a structure with an integrated heater formed on a silicon substrate using micro-electro-mechanical systems (MEMS) technology and a MOS material layer formed on the sensing chip as a surface-mount ceramic package. The gas sensing element required a heater power consumption of less than 100 mW. The actual heater power consumption was 15 mW. Hydrogen was presented to the gas sensing element from two gas tanks. A gas mixing system was utilized to dilute concentrations of hydrogen in the gas tanks to the desired concentrations. One gas tank had 20 ppm of hydrogen in air. The flow of 20 ppm of hydrogen in air from this gas tank was diluted with air resulting in concentrations of 0.77 ppm, 1.5 ppm, 2.3 ppm, and 3.1 ppm that were presented to the sensor. Another gas tank had 100% vol. of hydrogen. The flow of 100% vol. of hydrogen from that gas tank was diluted with air resulting in concentrations of 12.5% vol., 25.0% vol., 37.5% vol., and 50% vol. that were presented to the same sensor. Dielectric excitation of the sensing MOS element was achieved using an integrated circuit impedance analyzer such as ADuCM355 (Analog Devices, Norwood, MA 02062-9106, USA). Impedance measurements of the real and imaginary parts of impedances were performed over the frequency range from 10 to 200 kHz with the step size of 10 kHz. The scan time between this frequency range was 0.5 seconds. During exposures of the sensor to 0.77 ppm, 1.5 ppm, 2.3 ppm, and 3.1 ppm of hydrogen (i.e., relatively low gas concentrations), the gas sensing element was operated at 2.4 Volts and had a capacitance of 560 pF as a part of its electric circuit connected with the gas sensing element in parallel. Z" measurements were done at 10 kHz. During exposures of the sensor to 12.5% vol., 25.0% vol., 37.5% vol., and 50% vol. of hydrogen (i.e., relatively high gas concentrations), the gas sensing element was operated at 0.9 Volts and had a 5200 pF capacitor as a part of the sensor electrical circuit. Z" measurements were done at 200 kHz.

Figure 6:
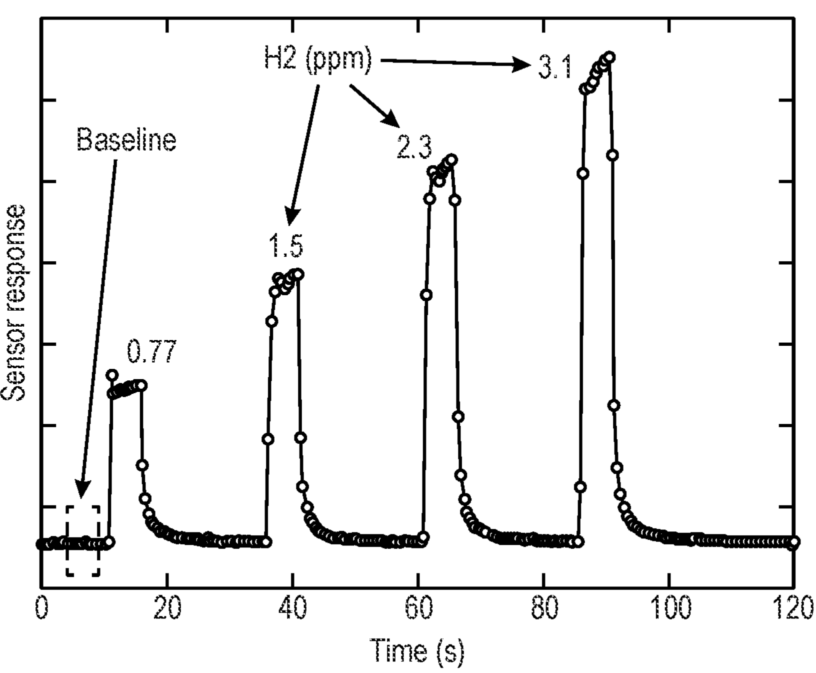
FIG. 6 illustrates a plot of the imaginary part of impedance of a sensing element as a function of test time across a first range of concentrations of an analyte of interest at a particular first frequency range, first operation temperature, and first tuning capacitor in accordance with one embodiment.

FIG. 6 illustrates the ultra-fast response speed of the presently disclosed sensor 114 when detecting broad dynamic range of relatively low concentrations of hydrogen gas at a first operational state associated with detecting low concentrations of hydrogen gas. Detection of hydrogen gas was performed at sub-ppm and low ppm levels. The responses of the sensor to 0.77 ppm, 1.5 ppm, 2.3 ppm, and 3.1 ppm of hydrogen were measured when the data acquisition was one data point per 0.5 seconds. The sensor had a limit of detection of 5 ppb. A baseline region highlighted with a square and the sensor response at the smallest tested hydrogen gas concentration of 0.77 ppm was utilized for calculation of the limit of detection. The sensor response speed was 1 to 2 data points to steps of different concentrations of hydrogen. The response speed of the hydrogen sensor was approximately 1 second, meeting the requirements for hydrogen safety and other applications. Such rapid response speed of the hydrogen sensor is a substantial advancement over conventional hydrogen gas sensor technologies.

Figure 7:
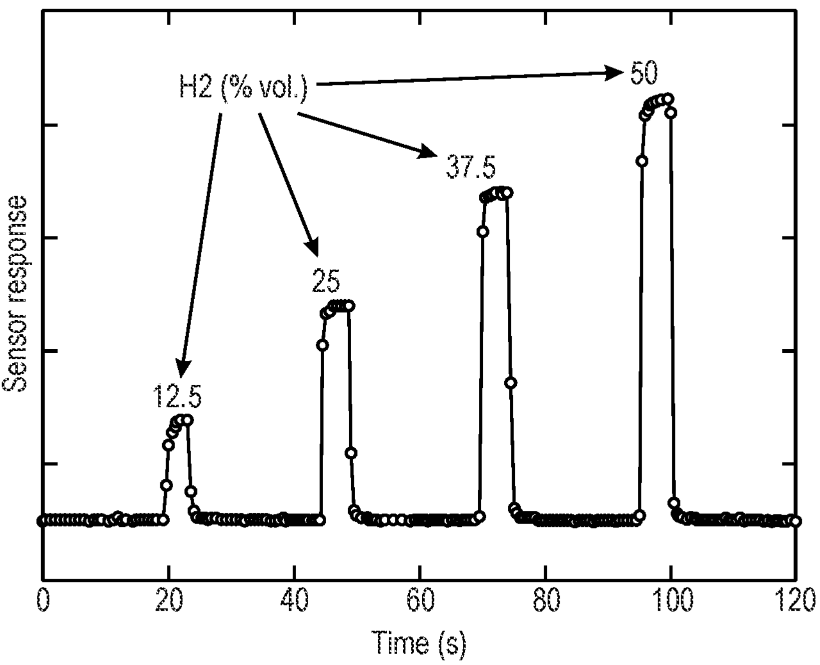
FIG. 7 illustrates a plot of the imaginary part of impedance of a sensing element as a function of test time across a second range of concentrations of an analyte of interest at a particular first frequency range, second operation temperature, and second tuning capacitor in accordance with one embodiment.

FIG. 7 illustrates the ultra-fast response speed of the presently disclosed sensor 114 when detecting broad dynamic range of relatively high concentrations of hydrogen gas at a second operational state associated with detecting high concentrations of hydrogen gas. Detection of hydrogen gas occurred up to 50% by volume, which is 12.5-fold higher than the lower explosive limit (LEL) for hydrogen in air (4% by volume). Sensor data collection was every 0.5 s. One or two data points were needed to achieve sensor response to hydrogen at these high concentrations.

The results shown herein demonstrate that the presently disclosed sensor can detect single-digit ppb levels of hydrogen. To calculate the limit of detection of hydrogen, the noise of the sensor and the signal strength of sensor response to hydrogen were measured. The limit of detection is the smallest detected concentration at a given signal-to-noise (e.g., SNR=3). The calculation of the limit of detection (LOD) at the SNR=3 was done by using the equation: LOD=[3×(noise of baseline region)×(0.77 ppm of H2)]/[sensor response to 0.77 ppm of H2]. The sensor disclosed herein has a limit of detection of 5 ppb. The gas sensor system and method disclosed herein allows detection of hydrogen over a broad range of hydrogen gas concentrations from ppb to percent-by-volume levels. As described herein, the presently disclosed sensor is designed to detect hydrogen at high percent-by-volume levels in air, including at levels higher than the lower explosive limit (LEL) for hydrogen in air (4% by volume). Such high concentrations of hydrogen cannot be reliably detected with conventional sensors such as catalytic pellistor sensors, MOS sensors and electrochemical sensors. As shown herein, the presently disclosed sensor detects hydrogen at up to 50% vol., which is 12.5-fold higher than LEL. Thus, the hydrogen sensor has dynamic range ranging from the limit of detection of 5 ppb to 50% by volume, which is the eight decades of hydrogen gas concentrations. This unexpected performance over such a broad measurement range is an important milestone for gas sensing concepts because conventional sensors have a typical range of 2-3 decades, rarely extending to 4-6 decades of gas concentrations.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A gas sensor system providing extended dynamic range of measurements of gas concentrations, the gas sensor system comprising:

a gas sensor comprising:

a gas sensing element comprising at least two electrodes, a dielectric substrate, and a sensing material coupled to the at least two electrodes and configured to be exposed to an analyte gas;

at least one heating element coupled to the sensing material, and the dielectric substrate and configured to heat the gas sensing element to an operation temperature based on a selected operation voltage;

at least one impedance detector configured to operate at two or more frequencies; and one or more tuning capacitors located in an electric circuit of the gas sensor system and parallel with the gas sensing element;

control circuitry configured to:

control a power supply of the at least one heating element, wherein the power supply is configured to select an operation voltage with which to heat the at least one heating element to reach an operation temperature based on the selected operation voltage;

adjust the two or more frequencies of the at least one impedance detector, wherein an alternating current excitation of the gas sensing element is provided at the two or more frequencies; and select the one or more tuning capacitors based on, at least in part, the selected operation voltage; and data acquisition circuitry configured to receive one or more response signals from the gas sensing element upon the alternating current excitation of the gas sensing element;

wherein the gas sensor is configured to detect a first range of gas concentrations via measuring the one or more response signals in response to the alternating current excitation of the gas sensing element at a first value of the one or more tuning capacitors and at a first value of the selected operation voltage;

wherein the gas sensor is configured to detect a second range of gas concentrations via measuring the one or more response signals in response to the alternating current excitation of the gas sensing element at a second value of the one or more tuning capacitors and a second value of the selected operation voltage, and wherein the second range of gas concentrations is different from the first range of gas concentrations, the second value of the one or more tuning capacitors is different from the first value of the one or more tuning capacitors, and the second value of the selected operation voltage is different from the first value of the selected operation voltage.

2. The gas sensor system of claim 1, wherein the data acquisition circuitry is configured to compare the one or more response signals with values stored in a look-up table to determine a concentration of the analyte gas in an environment at a given time or over time.

3. The gas sensor system of claim 1 wherein the sensing material is one of a metal oxide semiconductor material, dielectric polymer, conducting polymer, nanotube material, metal organic frameworks material, graphene, supramolecular compound material, two-dimensional transition metal carbide or nitride material.

4. The gas sensor system of claim 2, wherein the first value of the selected operation voltage is greater than the second value of the selected operation voltage.

5. The gas sensor system of claim 2, wherein the second value of the one or more tuning capacitors is greater than the first value of the one or more tuning capacitors.

6. The gas sensor system of claim 1, wherein the two or more frequencies of the impedance detector are at a shoulder of a dielectric relaxation region of an impedance spectrum of the sensing material.

7. The gas sensor system of claim 1, wherein the gas sensor is a wearable device worn by an operator.

8. The gas sensor system of claim 1, wherein the gas sensor has a response speed of one second at most.

9. The gas sensor system of claim 1, wherein the gas sensor is communicatively coupled to an alarm configured to provide an alert in response to the gas sensor detecting a concentration of gas exceeding a threshold.

10. The gas sensor system of claim 9, wherein the gas sensor is configured to implement a decision-making purpose in response to the concentration of gas exceeding the threshold.

11. The gas sensor system of claim 10, wherein the decision-making purpose includes activation of an emergency response, activation of a particular treatment, decontamination of a subject having the gas sensor, optimization of logistics steps after knowledge about the detected concentration of the gas, or minimization of logistics steps after the knowledge about the detected concentration of the gas.

12. A method of operating a gas sensor system providing extended dynamic range of measurements of gas concentrations, comprising:

applying contextual inputs for selection of application scenarios with an extended dynamic range of measurements of gas concentrations;

preselecting operation parameters of the gas sensor system based on the applied contextual inputs, wherein the operation parameters comprise:

first operation parameters, that when selected, are configured to measure a first range of gas concentrations, wherein the first operation parameters comprise a first capacitance value of a tuning capacitor, a first operation voltage, and a first operation temperature; and second operation parameters, that when selected, are configured to measure a second range of gas concentrations different from the first range of gas concentrations, wherein the second operation parameters comprise a second capacitance value of the tuning capacitor different from the first capacitance value, a second operation voltage different from the first operation voltage, and a second operation temperature different from the first operation voltage;

exposing a gas sensing element of a gas sensor to an environment comprising an analyte gas, wherein the gas sensing element comprises at least two electrodes, a dielectric substrate, and a sensing material coupled to the substrate and configured to be exposed to an analyte gas;

heating the sensing material to an operation temperature corresponding to the preselected operation parameters via a heating element;

providing the tuning capacitor with a capacitance value corresponding to the preselected operation parameters in parallel to the gas sensing element;

measuring one or more impedance outputs of the gas sensing element via an impedance detector at the preselected operation parameters;

comparing the one or more impedance outputs at the preselected operation parameters to corresponding values stored in a look-up table;

determining a concentration of measured gas at a given time or over a period of time based on the look-up table;

displaying the determined concentration of measured gas at a given time or the determined concentrations of measured gas over time via an output device.

13. The method of claim 12, comprising providing a linearity of sensor response over different ranges of gas concentrations via selection of the preselected operation parameters, wherein the preselected operation parameters comprise an operation frequency.

14. The method of claim 12, wherein the preselected operation parameters correspond to detecting the first range of concentrations of gas down to 5 ppb.

15. The method of claim 12, wherein the preselected operation parameters correspond to the second range of concentrations of gas up to 50% by volume.

16. A gas sensor providing extended dynamic range of measurements of gas concentrations, comprising:

a gas sensing element comprising at least two electrodes, a dielectric substrate, and a sensing material coupled to the substrate and configured to be exposed to an analyte gas;

at least one heating element coupled to the dielectric substrate and configured to heat the gas sensing element to an operation temperature based on a selected operation voltage;

at least one impedance detector configured to operate at two or more operation frequencies;

one or more tuning capacitors located in an electric circuit of the gas sensor and parallel with the gas sensing element; and control circuitry comprising:

a controller of a power supply of the at least one heating element configured to select the operation voltage with which to heat the at least one heating element to reach the operation temperature;

a controller of the at least one impedance detector configured to adjust the two or more frequencies of the at least one impedance detector, wherein an alternating current excitation of the gas sensing element is provided at the two or more frequencies; and a controller of the one or more tuning capacitors configured to select the one or more tuning capacitors based on, at least in part, the selected operation voltage;

wherein the gas sensor is configured to detect a first range of gas concentrations via measuring one or more response signals in response to the alternating current excitation of the gas sensing element at a first value of the one or more tuning capacitors and at a first value of the selected operation voltage;

wherein the gas sensor is configured to detect a second range of gas concentrations via measuring the one or more response signals in response to the alternating current excitation of the gas sensing element at a second value of the one or more tuning capacitors and a second value of the selected operation voltage, and wherein the second range of gas concentrations is different from the first range of gas concentrations, the second value of the one or more tuning capacitors is different from the first value of the one or more tuning capacitors, and the second value of the selected operation voltage is different from the first value of the selected operation voltage.

17. The gas sensor of claim 16, wherein the sensing material comprises metal oxide semiconductor material.

18. The gas sensor of claim 17, wherein the gas sensor is configured to detect the first and second range of gas concentrations via the at least one impedance detector operating at the two or more operation frequencies, wherein the at least one impedance detector detects one or more dielectric excitation responses of the gas sensing element, and wherein the two or more frequencies are at a shoulder of a dielectric relaxation region of an impedance spectrum of the metal oxide semiconductor sensing material to provide at least eight orders of magnitude of gas concentrations of the dynamic range of the gas sensor.

19. The gas sensor of claim 16, wherein the gas sensor is configured to detect the first and second range of gas concentrations via a processor configured to receive the detected one or more dielectric excitation responses of the gas sensing element and to compare the responses with values stored in a look-up table.

20. The gas sensor of claim 16, wherein the sensing material comprises semiconductor material.

21. The gas sensor of claim 16, wherein the gas sensor is a wearable device worn by an operator.

22. A gas sensor system providing extended dynamic range of measurements of gas concentrations, the gas sensor system comprising:

a gas sensor comprising:

a gas sensing element comprising at least two electrodes, a dielectric substrate, and a sensing material coupled to the at least two electrodes and configured to be exposed to an analyte gas;

at least one energy-delivering element coupled to the sensing material and configured to deliver energy to the gas sensing material to an operation energy level based on a selected energy level;

at least one impedance detector configured to operate at two or more frequencies; and one or more tuning capacitors located in an electric circuit of the gas sensor system and parallel with the gas sensing element; and control circuitry configured to:

control an energy source of the at least one energy-delivering element, wherein the energy source is configured to select an energy level with which to control the at least one energy source element to reach an operation energy level based on the selected operation energy level;

adjust the two or more frequencies of the at least one impedance detector, wherein an alternating current excitation of the gas sensing element is provided at the two or more frequencies; and select the one or more tuning capacitors based on, at least in part, the selected operation energy level; and data acquisition circuitry configured to receive one or more response signals from the gas sensing element upon the alternating current excitation of the gas sensing element;

wherein the gas sensor is configured to detect a first range of gas concentrations via measuring the one or more response signals in response to the alternating current excitation of the gas sensing element at a first value of the one or more tuning capacitors and at a first value of the selected operation energy level;

wherein the gas sensor is configured to detect a second range of gas concentrations via measuring the one or more response signals in response to the alternating current excitation of the gas sensing element at a second value of the one or more tuning capacitors and a second value of the selected operation energy level, and wherein the second range of gas concentrations is different from the first range of gas concentrations, the second value of the one or more tuning capacitors is different from the first value of the one or more tuning capacitors, and the second value of the selected operation energy level is different from the first value of the selected operation energy level.

23. The gas sensor system of claim 22, wherein the energy source produces at least one or a combination of thermal, radiant, or acoustic types of energy.

* * * * *